US012759815B2

(12) United States Patent
Heger et al.

(10) Patent No.: US 12,759,815 B2
(45) Date of Patent: Oct. 13, 2026

(54) DEVICE FOR SEPARATING BULK MATERIAL

(71) Applicant: FRESENIUS MEDICAL CARE DEUTSCHLAND GMBH, Bad Homburg (DE)

(72) Inventors: Johannes Heger, Rottendorf (DE); Daniel Seewald, Opferbaum (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 293 days.

(21) Appl. No.: 18/696,368

(22) PCT Filed: Sep. 27, 2022

(86) PCT No.: PCT/EP2022/076790
§ 371 (c)(1),
(2) Date: Aug. 27, 2024

(87) PCT Pub. No.: WO2023/057258
PCT Pub. Date: Apr. 13, 2023

(65) Prior Publication Data

US 2024/0417193 A1 Dec. 19, 2024

(30) Foreign Application Priority Data

Oct. 4, 2021 (DE) ..................... 10 2021 125 613.5

(51) Int. Cl.
*B65G 65/48* (2006.01)
*B65G 11/20* (2006.01)
*B65G 47/19* (2006.01)

(52) U.S. Cl.
CPC ........ *B65G 65/4881* (2013.01); *B65G 11/206* (2013.01); *B65G 47/19* (2013.01); *B65G 2201/04* (2013.01)

(58) Field of Classification Search
CPC .. B65G 65/4881; B65G 11/206; B65G 47/19; B65G 2201/04; B65G 11/203; B65G 47/1407
See application file for complete search history.

(56) References Cited

U.S. PATENT DOCUMENTS 2,364,163 A 12/1944 Pearson
3,933,239 A * 1/1976 Yoshida .................. A61J 3/074 198/384
(Continued)

FOREIGN PATENT DOCUMENTS

DE 69309844 T2 10/1997
DE 29821306 U1 3/1999
(Continued)

OTHER PUBLICATIONS

International Search Report and Written Opinion (with English translation of International Search Report) issued in corresponding International Patent Application No. PCT/EP2022/076790 mailed Feb. 1, 2023 (5 pages).
(Continued)

*Primary Examiner* — Vishal Pancholi
(74) *Attorney, Agent, or Firm* — Kilyk & Bowersox, P.L.L.C.

(57) ABSTRACT

The present invention relates to a device for separating bulk material, comprising a conveying device in the form of a rotatable drum, which has one or more receptacles for separately conveying the bulk material from a feeding area for bulk material and is designed to convey bulk material by means of the one or more receptacles in a separated manner from the feeding area to a depositing surface during rotation of the drum.

18 Claims, 8 Drawing Sheets

(56) References Cited

U.S. PATENT DOCUMENTS

| | | | | | |
|---|---|---|---|---|---|
| 4,353,456 | A | * | 10/1982 | Yamamoto | A61J 3/074 198/384 |
| 4,394,933 | A | * | 7/1983 | Ackley | B65G 47/1471 198/377.01 |
| 5,415,267 | A | * | 5/1995 | Sato | B65G 47/1407 198/380 |
| 5,454,464 | A | * | 10/1995 | Yamamoto | B65G 47/848 198/384 |
| 5,472,305 | A | | 12/1995 | Ikeda et al. | |
| 5,996,768 | A | * | 12/1999 | Boyce | B65G 47/1471 198/397.03 |
| 6,059,518 | A | * | 5/2000 | Hamilton | B65G 47/145 414/754 |
| 2021/0037879 | A1 | * | 2/2021 | Stanikowski | B65B 35/44 |

FOREIGN PATENT DOCUMENTS

| | | | |
|---|---|---|---|
| DE | 102004013544 | A1 | 10/2005 |
| DE | 102011084787 | A1 | 4/2013 |
| DE | 102013206482 | A1 | 10/2014 |
| FR | 2277750 | A1 | 2/1976 |

OTHER PUBLICATIONS

Office Action issued in corresponding German Patent Application 10 2021 125 613.5 mailed Apr. 28, 2022.

* cited by examiner

DEVICE FOR SEPARATING BULK MATERIAL

This application is a National Stage Application of PCT/EP2022/076790, filed Sep. 27, 2022, which claims priority to German Patent Application No. 10 2021 125 613.5, filed Oct. 4, 2021.

The present invention relates to a device for separating bulk material, in particular in the medical field, and to a system for separating bulk material with a device according to the invention.

In automated production, robots often have to pick up individual parts, e.g. workpieces. As these individual parts or workpieces are usually stored as bulk material, it is difficult to pick up specific individual workpieces from a large number of overlapping workpieces.

Against this background, the object of the present invention is to mitigate or even completely eliminate the problems of the prior art and, in particular, to create a device for the simple handling of workpieces, in particular for the separation of workpieces, which simplifies the individual pick-up of certain workpieces.

This object is achieved by the subject matters of the independent claims. Advantageous further embodiments of the invention are the subject matter of the dependent claims.

Accordingly, a device for separating bulk material is provided having a conveying device in the form of a rotatable drum, which has one or more receptacles for separately conveying the bulk material from a feeding area for bulk material and is designed to convey bulk material by means of the one or more receptacles in a separated manner from the feeding area to a depositing surface during rotation of the drum.

Only a limited number of workpieces from the bulk material, e.g. between two and ten pieces, fit into the receptacles of the drum. These are removed from the feeding area in the receptacle by the drum rotating and conveyed to a depositing surface. The number of workpieces conveyed onto the depositing surface with each conveying stroke thus corresponds, for example, to the number of workpieces picked up in a receptacle of the drum. In other words, the separating process can mean that a smaller quantity of bulk material is conveyed from a larger quantity. For example, only one workpiece can be conveyed at a time. Alternatively, the number of conveyed workpieces can also be within a predefined range, for example 1 to 10 workpieces, for example 2 to 5 workpieces. Separation can consist of reducing the number of workpieces in the feeding area by at least 2 during a conveying stroke.

The drum can have a plurality of receptacles, in particular 2 to 6 receptacles, in particular 4 receptacles, for conveying the bulk material individually from the feeding area. For example, when the drum is rotated by 90°, one receptacle can be loaded or emptied at a time.

It may be provided that the device is designed to convey bulk material by means of the drum in a free-running manner, at least in sections. The drum and/or walls of the device adjacent thereto can thus be configured in such a way that a receptacle for the drum is not limited by these adjacent walls of the device, such that the number of pieces of bulk material that can be picked up in the receptacle is not limited by a wall of the device adjacent to the drum. An adjacent wall can be provided in the area of the circumference of the drum in which bulk material is not transported in the receptacle(s) when the device is in use. Such an adjacent wall may or may not be provided along the circumference and in areas where no bulk material is transported. The drum and/or walls of the device adjacent thereto can thus be configured in such a way that the walls of the device do not limit or at least partially close a receptacle of the drum at any time during the rotation of the rotatable drum. In particular, the device could not have a wall opposite or adjacent to the drum along the areas in which the bulk material is transported during operation, in particular not at a distance by which the conveying of the bulk material by the drum is influenced. The term “free-running” therefore means that no wall covering the receptacle is provided or is arranged in such a way that the bulk material is scraped against this wall during rotation. In other words, according to one embodiment, no wall is provided that influences how much bulk material is actually transported in the receptacle. The absence of such a wall can avoid the risk of the bulk material jamming between the drum and the wall, which can allow the device to operate faultlessly.

In practice, it has been shown that separation is supported if the drum has one or more surface structures, in particular in the form of protrusions and/or recesses. This ensures that the bulk material is conveyed evenly.

Here, the surface structures of the drum can, for example, extend at least partially along the outer circumference of the drum, for example around the circumferential surface of the drum, and/or a plurality of surface structures can be arranged parallel to one another.

In order to reduce the pressure of the bulk material on the drum, at least one limiting element, for example in the form of a retaining wall or a continuous or interrupted wall, can be provided between the drum and the feeding area, which limits the flow of the bulk material to the drum or allows the bulk material to slide down in a controlled manner. An opening in the limiting element can be arranged opposite the receptacle in the drum in such a way that the bulk material can be guided along the wall in the direction of the receptacle.

Alternatively or additionally, at least one brush can be provided between the drum and the feeding area. The brush can be a limiting element. The brush can be slidably mounted via at least one resetting element, for example a spring. The brush can be mounted on another limiting element, for example the retaining wall.

A limiting element can thus comprise a combination of a retaining wall and a brush, wherein the brush can be slidably mounted on the retaining wall via a spring.

Two brushes can be provided between the drum and the feeding area. These can each be slidably mounted on a limiting element via at least one resetting element, for example a spring, wherein one brush limits the movement of bulk material out of the feeding area and the other brush limits the movement of the bulk material into an area in front of the drum.

The brush, which limits the movement of the bulk material out of the storage container structure, can serve to prevent too much pressure from above being exerted on the bulk material further down via the downhill force. A combination of the brush and retaining wall with springs can be used here. This can make it possible for jammed bulk material to clear the way downwards, but also to limit the quantity. Bulk material cannot be “caught” at the top because it very unfortunately gets stuck.

The brush directly in front of the drum can serve as overflow protection so that there is not too much bulk material in the area in front of the drum. This ensures that not too much bulk material is transferred into the area of the drum.

Brushes can be used because they are more flexible than the retaining wall, for example. Brushes can therefore allow the bulk material to pass through better, even if it is jammed together. The fact that one, a plurality of or all brushes can be spring-mounted and can optionally be attached to a retaining wall means that the brushes can also be moved slightly to allow jammed items to pass through. This may also be desirable, as the parts can separate when they fall onto the chute.

The brush, which limits the movement of bulk material from the feeding area, and/or the associated limiting element can, for example, be arranged on a container for holding bulk material and/or be formed in one piece with such a container.

Each brush arranged between the drum and the feeding area can be arranged in such a way that it is designed to engage from above in a conveying direction of bulk material and bulk material is thus conveyed through the brush. In other words, each brush arranged between the drum and the feeding area can be arranged in such a way that a longitudinal axis of the brush is orthogonal to a conveying direction of the bulk material.

According to one embodiment, at least one sensor is provided, for example in the form of a light barrier, a camera, a Hall sensor or another sensor that identifies the movement of a drum. The sensor can be used to monitor the movement of the drum. For this purpose, the sensor can be connected to a control unit that processes a signal from the sensor. The control unit can be designed to adjust and, if necessary, stop the movement of the drum.

The control unit can have a microprocessor and can be connected to the sensor by means of a data signal line and to the drum or a drum drive by means of a further data signal line.

In order to simplify the pick-up of the workpieces from the feeing area by the drum, at least one receptacle of the drum can have at least one curved or arched contour, such that a shovel-shaped holder is formed. With a receptacle designed in this way, the workpieces can be picked up particularly easily.

Another aspect of the invention relates to a system having at least one device according to the invention for separating bulk material as well as a feeding area for bulk material, preferably in the form of a box or container, which can be or is connected to this device, and a conveying device, preferably in the form of a chute or a conveyor belt, which is designed to transport the separated bulk material from the rotatable drum to the depositing surface.

The conveying device can be designed in the form of a chute, which has a curvature in the form of a slope at its end facing away from the rotatable drum. This can influence the trajectory of the conveyed bulk material. In particular, the curvature of the slope can be designed in such a way that bulk material conveyed via the chute is guided against the force of gravity. In other words, the curvature can be directed upwards when the device is positioned as intended. Alternatively, the curvature can simply end in an essentially flat end and only have a step to the depositing surface.

An impact guard in the form of a brush can be installed downstream of the drum along the chute, which preferably projects into the conveying direction of the bulk material on the chute. The brush can be arranged in such a way that it protrudes from above in a conveying direction of the bulk material on the chute and/or touches a surface of the chute. The brush along the chute can be used to ensure that bulk material that is protruding upwards comes to rest flat on the chute.

The chute, optionally in the area of the slope, can at its end facing away from the rotatable drum, have at least one deflection means, for example in the form of a bevelled edge and/or a bulge, by means of which bulk material conveyed on the chute can be deflected to the left and/or right out of the conveying direction. For example, the chute can have a central bulge that thickens conically towards one end of the chute, deflecting bulk material to the side.

Alternatively or additionally, the chute can have at least one ramp, for example in the area of the slope, which is inclined in a direction that is orthogonal to a conveying direction of bulk material on the chute. Two ramps can be provided, which are inclined away from or towards each other.

Alternatively or additionally, the chute can have a lateral wall on one side of a chute surface, which is not perpendicular to the chute surface at the end facing away from the drum. On the side of the chute surface opposite the non-vertical side wall, no side wall can be arranged on the chute surface, at least over a section at the end of the chute.

By designing the chute with a slope and/or a central deflection bulge and/or a non-vertical wall and/or a recess on a side wall at the end of the chute, it may be possible to distribute bulk material more widely. This can support the separation of the bulk material and can reduce the complexity of the gripping process for a robot.

The feeding area for bulk material can be arranged at an angle to the horizontal in such a way that bulk material contained in the feeding area moves towards the drum due to gravity.

The feeding area can have a storage container for bulk material, which enables the storage of larger quantities of bulk material and therefore less frequent feeding with bulk material.

For improved space utilisation, the storage container can be arranged in such a way that it is aligned with a housing in which the drum is or can be accommodated.

Furthermore, it may be provided that at least a part of the housing in which the drum is or can be accommodated is detachably connected to the device and/or the rest of the housing, such that the drum is accessible for maintenance or replacement, for example, without the entire housing having to be dismantled.

The device can have an angle adjustment mechanism for changing the angle to the horizontal. This can be a tilting mechanism or a rotation mechanism with a continuous or stepped fixation mechanism. The angle adjustment mechanism can be operated manually or automatically by means of a motor.

A catching device, for example in the form of a basket or container, can be provided between the rotatable drum and the conveying device, for example in the form of a chute. The catching device can catch bulk material conveyed by the drum, slow it down and transfer it to the conveyor in a controlled manner. The catching device can be arranged on the device in a movable, for example height-adjustable, manner so that the position of the catching device can be adapted to different angles of inclination of the conveying device.

According to one embodiment, a plurality of devices according to the invention is provided, which device are designed to convey bulk material onto a common depositing surface. Alternatively, each device can also be assigned its own depositing surface.

In other words, the invention can be described as follows:

A drum arrangement is provided for separating workpieces. The drum is mounted so that it can rotate about its longitudinal axis. One or more receptacles, preferably four, are formed on the lateral surface, which extend over a partial section in the longitudinal and circumferential direction. The recesses are preferably designed in such a way that a small number of workpieces, preferably 4-6 or 8-10 workpieces depending on the desired option, can be accommodated in one recess at the same time.

The receptacle(s) can be recesses.

The receptacles can also be magnetic areas on the drum that can be switched on and off, wherein the magnetic force is switched on or activated when the receptacle approaches the feeding area and is switched off when the separated bulk material is to be discharged into the conveying device.

The receptacle(s) can be passive gripping functions. The receptacle scan also be a rake-shaped receptacle. Using the example of a screw as bulk material, a rake can be used that is moved through the bulk material when the drum rotates and the distance between the tines of the rake is adapted to the diameter of the shaft in such a way that the shaft slips through the distance while the head of the screw is too wide for this. When the drum rotates, the screws from the rake can then fall out of the rake due to gravity.

The workpieces to be picked up are held in a container. The container is suspended at an adjustable angle so that the workpieces lying in the container slide to the side of the container on which the drum is positioned.

For example, the drum is rotatably suspended by means of a stepper motor, for example via deep groove ball bearings, so that each step is preferably rotated by 90 degrees. According to one embodiment, the receptacles or recesses have a shovel-like shape, so that the underside is curved and/or reinforced with teeth. This curved shape means that the workpieces can be easily picked up when the drum is rotated.

The drum picks up a small number of workpieces from the container in its recess and then, after rotating by 180 degrees or more, for example, tilts the workpieces onto a conveying device, e.g. a conveyor channel/conveyor chute, arranged below the drum.

The rotation of the drum can be monitored by sensors, for example a light barrier or another of the sensors described above, which is triggered by projections on the circumference of the drum, for example.

No special safety measures need to be taken here, as it is not possible to pinch a finger etc., preferably due to the housing of the device, or in the worst case scenario this could lead to the stepper motor spinning and then switching off. In other words, the motor can spin at a resistance that is beyond a limit value.

In addition to the four receptacles or recesses for material pick-up mentioned by way of example, the drum itself preferably has one or more further smaller surface recesses that distribute the bulk material evenly in order to achieve a constant feed rate.

For example, a retaining wall can be built in front of the drum(s), which holds back the bulk material in the feeding area. The retaining wall is only gravity-supported and holds back most of the bulk material to reduce the pressure on the drums. Preferably, the retaining wall can have at least one or more flexible elements, in particular brushes, in particular strip brushes. The use of flexible elements prevents the bulk material from jamming. The strip brush can be made of rows of plastic bristles. The flexible element can be mounted on the retaining wall. This allows the containers to be completely filled with bulk material and the drums constantly convey the material to the end.

According to a further development, the system can also have a unit that further processes the workpieces. In particular, the system can have a pressing unit. The further processing unit or pressing unit can be a unit that carries out a work step downstream of the separation of bulk material.

According to a further development of the system, the pressing unit can have a pick-up unit into which the now separated workpieces can be introduced. In particular, the pick-up unit can be designed as a pallet so that the position of each workpiece is defined after it has been introduced.

According to a further development, the further processing unit can have at least one securing mechanism, by means of which manipulation of a working chamber, in particular a pressing chamber, is prevented. In particular, manipulation of the working chamber can be an unauthorised intervention from outside the working chamber.

The device or system according to the invention makes it possible to easily machine workpieces by means of an automated process. In particular, it is possible to facilitate conveying and processing by a robot. The targeted separation of the workpieces allows them to be gripped in a defined manner by a robot, for example, and fed for further processing.

Further advantages, features and effects of the present invention are shown in the following de-scription of preferred embodiments with reference to the figures, in which the same or similar components are designated by the same reference numerals. In the figures:

FIG. 1 shows a device according to the invention having a drum and a feeding are for bulk material;

FIGS. 2*a* and 2*b* each show a drum according to one embodiment of the invention;

Figure 1:
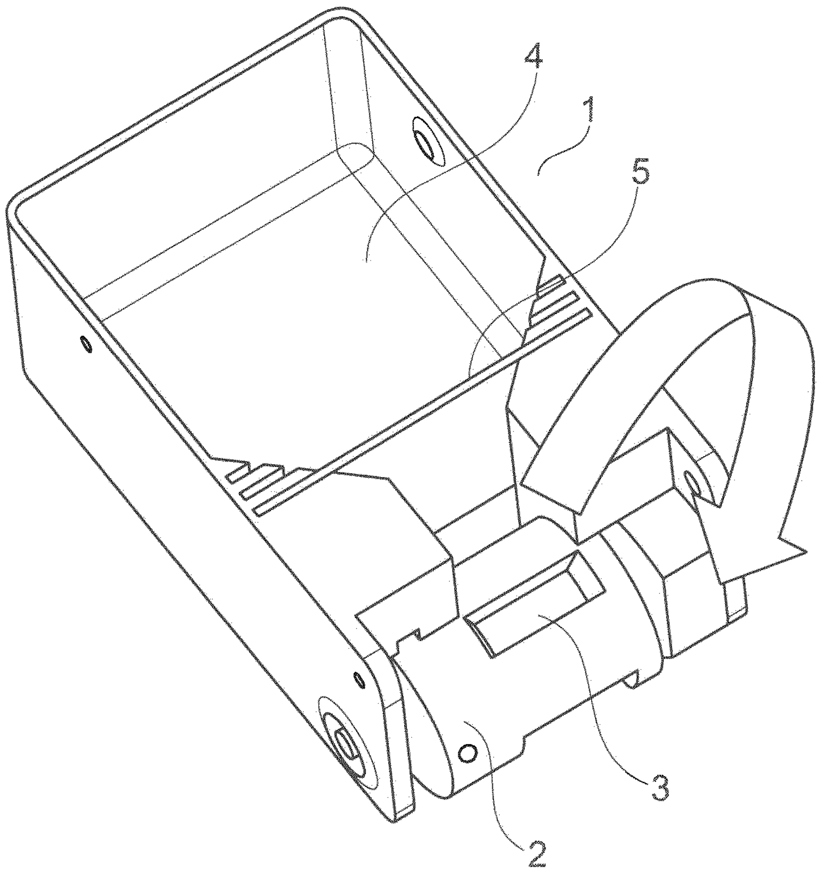

FIG. 1 shows a device 1 for separating bulk material having a conveying device in the form of a rotatable drum 2, which has one or more receptacles 3 for separately conveying the bulk material from a feeding area 4 for bulk material and is designed to convey bulk material by means of the one or more receptacles 3 in a separated manner from the feeding area 4 to a depositing surface during rotation of the drum 2 in the direction of the arrow.

The inflow of bulk material from the feeding area 4 to the drum 2 is limited or regulated by a retaining wall 5.

Figure 2A:
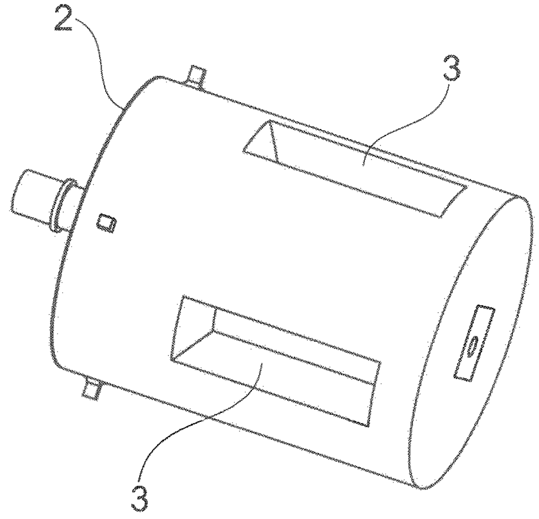
Figure 2B:
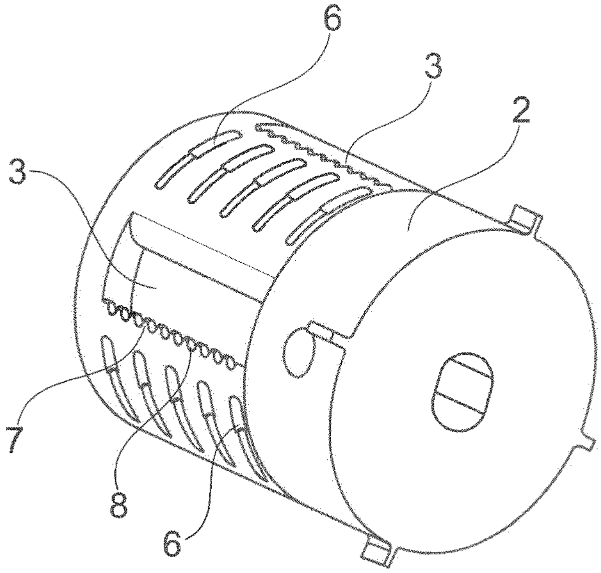

FIG. 2*a* shows a drum 2 having receptacles 3 for conveying bulk material. As shown in FIG. 2*b*, the drum 2 can have surface structures 6 on its outer circumferential surface, which enable particularly constant conveying of bulk material. The surface structures 6 can comprise recesses and/or protrusions.

In this embodiment, the receptacles 3 have a plurality of curved recesses on one contour, forming a plurality of protrusions 8 in the manner of the teeth of an excavator shovel. This design ensures particularly reliable pick-up of the bulk material.

Figure 3:
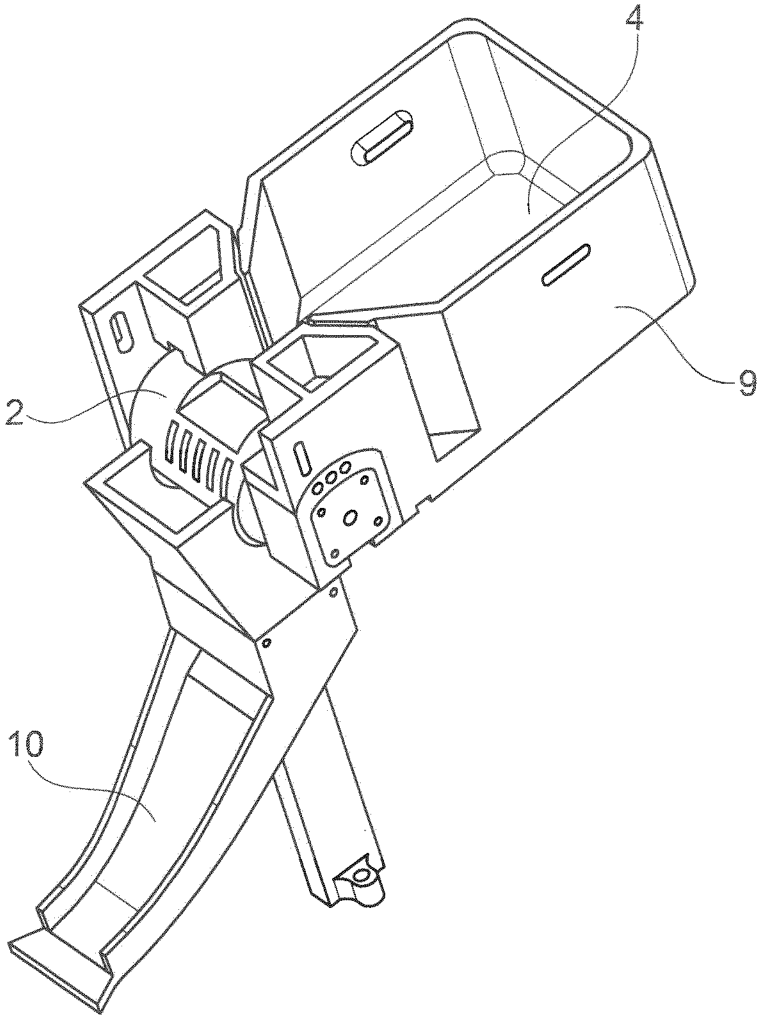
FIG. 3 shows a system according to the invention according to one embodiment.

FIG. 3 shows a system according to the invention with a drum 2, a feeding area 4 for bulk material formed by a container 9 and a conveying device in the form of a chute 10, on which the individual workpieces are guided to a depositing surface.

Figure 4:
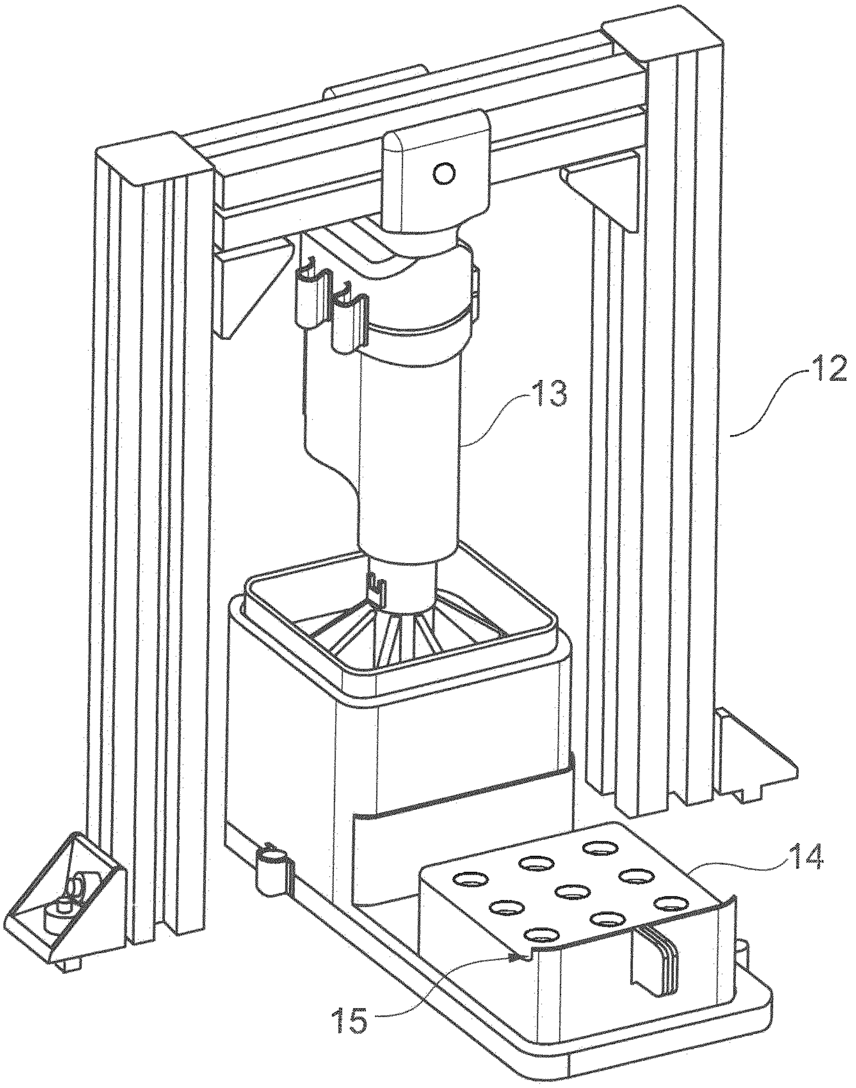
FIG. 4 shows a pressing unit according to the invention according to one embodiment.

FIG. 4 shows a pressing unit 12 according to the invention, which can be designed as part of the system according to the invention. The pressing unit supports an automated pressing step in order to keep both the steps that have to be carried out by an operator and the assembly as standardised as possible.

As shown in FIG. 4, the pressing unit can have a piston 13, which is moved by means of a linear motor, for example. The now separated workpieces can now be picked up in a defined manner by a robot and placed on a pallet 14. This pallet can be mounted so that it can be moved in a linear manner so that loading takes place outside a pressing chamber of the pressing unit. The workpieces can then be arranged on the pallet and pushed into the pressing chamber for pressing.

One or more safety mechanisms can be provided to prevent an operator from accidentally entering the pressing chamber or the pressing process from starting before the pallet 14 is fully positioned in the pressing chamber. For example, the pressing unit 12 can have a shielding edge 15 or an elevation on the pallet 14 and/or a protrusion on the housing surrounding the pressing chamber. Additionally or alternatively, a safety mechanism can be designed so that the pressing process can only be started when the pallet 14 is fully accommodated in the pressing chamber.

This means that relays can only be closed when the pallet is in a predefined position in the pressing chamber. For example, the pallet can have a conductive strip and two contact pins can be formed in the pressing chamber so that the contact circle is only reached in the predefined position of the pallet. Similarly or alternatively, a light barrier can be arranged in such a way that it is only triggered when the pallet is in the defined position. Additionally or alternatively, a light barrier can be provided, which prevents or stops the pressing process in the event of an interruption. This means that the light barrier can be interrupted if an operator intervenes, preventing the pressing process.

An optical inspection step can also be provided before the pressing process. The arrangement of the workpieces can be recorded by a camera and checked by an evaluation unit. An optical inspection step can also be carried out after the pressing process. This allows the result to be recorded and analysed. For example, image recognition processes using artificial intelligence can be used for this purpose. For example, the images captured by the camera can be fed as data records to a neural network in order to detect deviations between the actual state and a target state.

Figure 5:
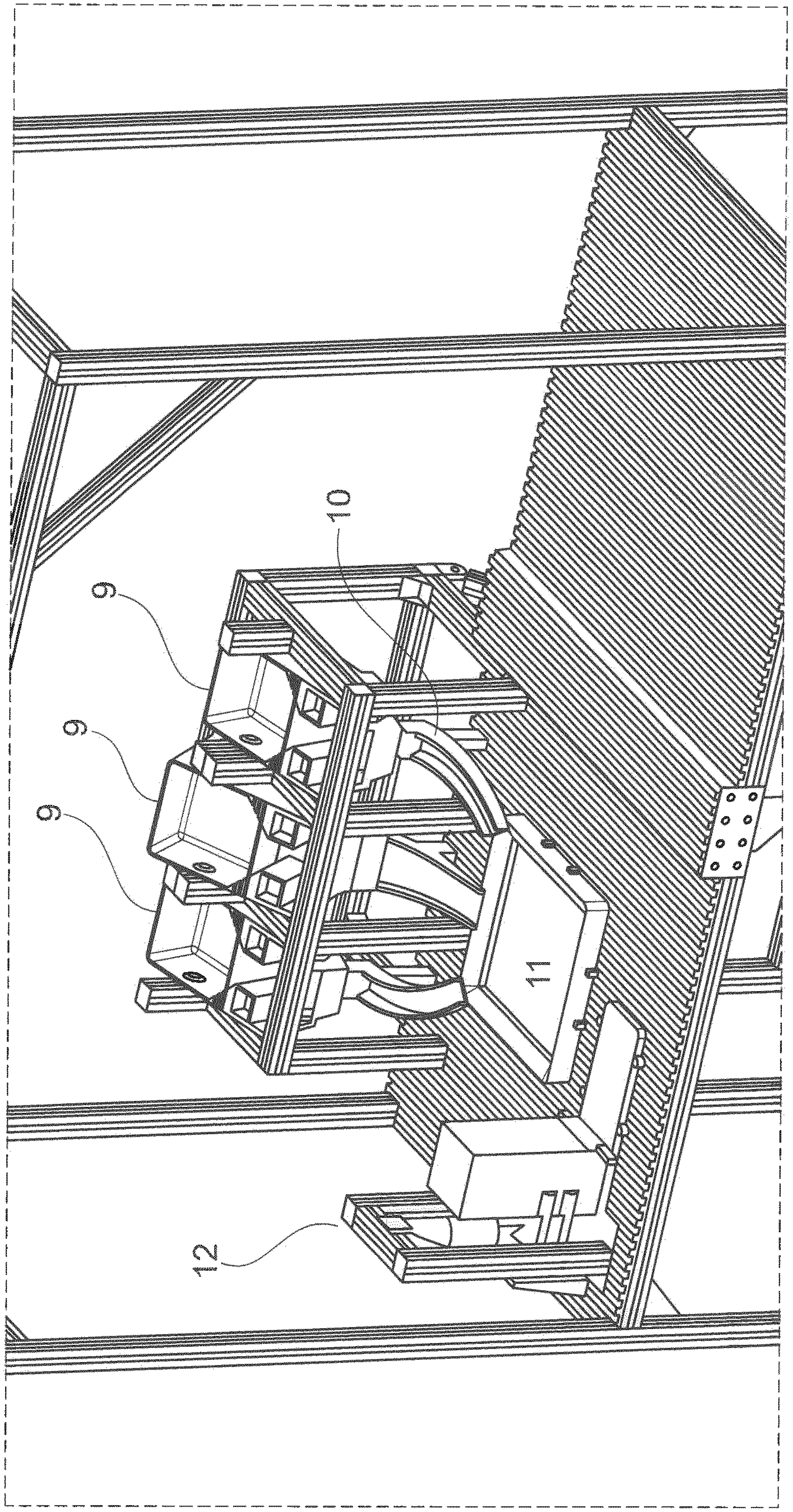
FIG. 5 shows a system according to the invention having a plurality of devices according to the invention.

FIG. 5 shows a system according to the invention with three devices according to the invention arranged next to each other, each having a container 9, a drum 2, a chute 10 and a pressing unit, which are assigned to a common depositing surface 11.

Figure 6:
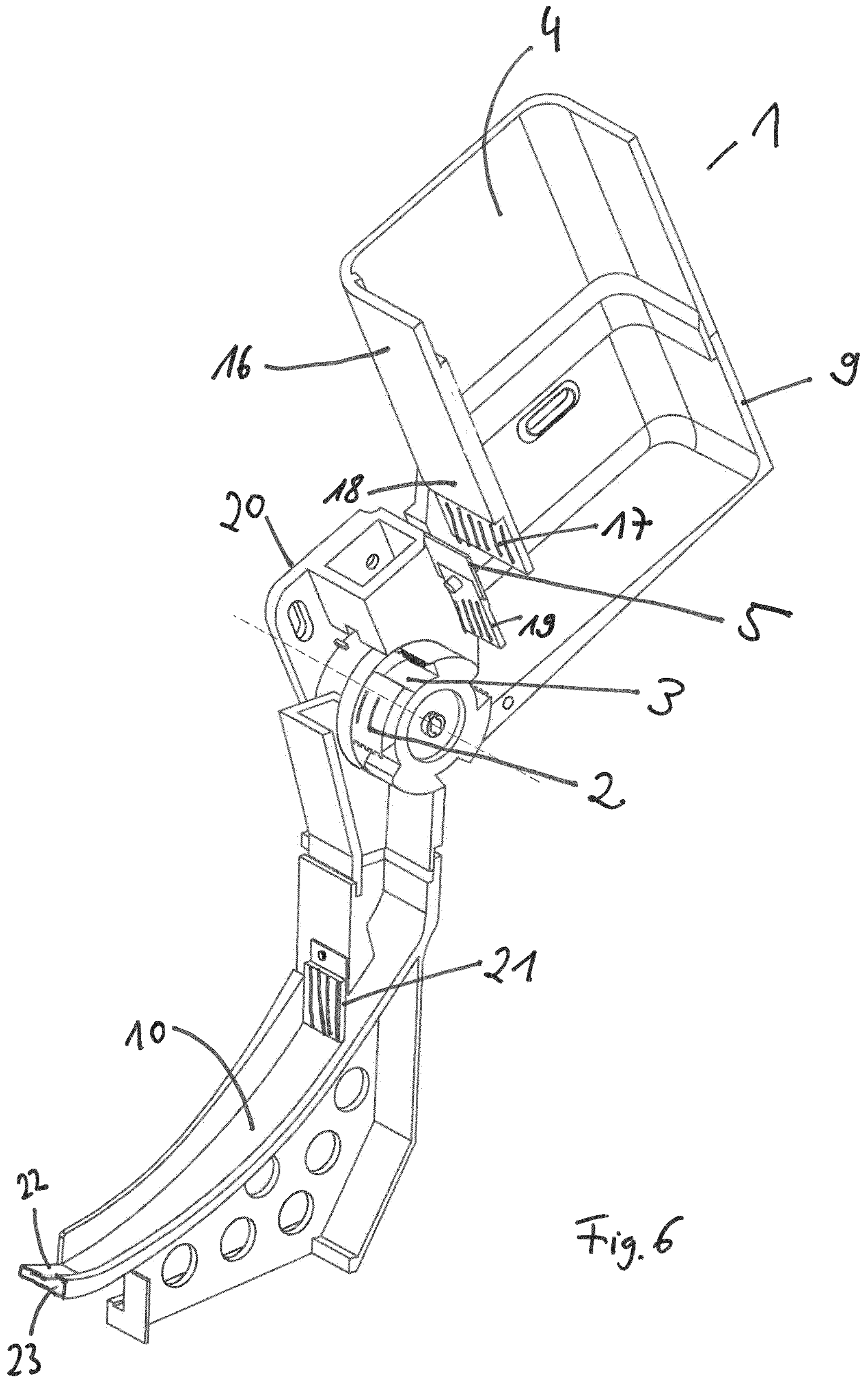
FIG. 6 shows a sectional view of a device according to the invention.

FIG. 6 shows a device according to the invention, in which the feeding area 4 for bulk material is enlarged beyond the container 9. A container structure 16 is provided for this purpose, which is preferably detachably connected to the container 9.

In this embodiment, the movement of bulk material out of the container 9 is limited by a brush 17, which is arranged at one end of the container structure 16 facing the drum 2. The brush 17 is mounted on a retaining wall 18 by means of at least one spring.

Instead of a combination of a brush and a retaining wall, only one brush can also be used.

A brush 19 is arranged downstream of the brush 17 in the direction of movement of the bulk material from the container 9 to the drum 2, which is displaceably mounted on the retaining wall 5 by means of at least one spring.

Instead of a combination of a brush 19 and a retaining wall 5, only one brush 19 can also be used.

It can also be seen in FIG. 6 that the drum 2 conveys bulk material in a free-running manner, so that the quantity of bulk material picked up in a receptacle 3 is not limited by a wall of the housing 20 surrounding the drum 2. The receptacle 3 of the drum 2 can therefore be filled with bulk material. In addition, an individual element of the bulk material can be accommodated in a receptacle 3 in any orientation and protrude from it, for example.

In this design, a brush 21 is also provided along the chute 10, which dampens the movement of bulk material on the chute 10 and thus ensures controlled transport of bulk material along the chute 10. Preferably, the brush 21 is not arranged on a retaining wall in order to prevent bulk material from getting caught on the retaining wall.

At one end facing away from the device 1, the chute 10 has a slope 22, i.e. the chute 10 is curved upwards in the illustration in FIG. 6. This extends the trajectory of bulk material conveyed via the chute due to the steeper departure angle.

In addition, the chute 10 has a lateral ramp 23 at the slope 22, by means of which bulk material is deflected to the right from a conveying direction along the chute 10. No side wall bounding the side of the chute can be provided opposite the lateral ramp 23. This can have the effect of increasing the scattering range.

Figure 7:
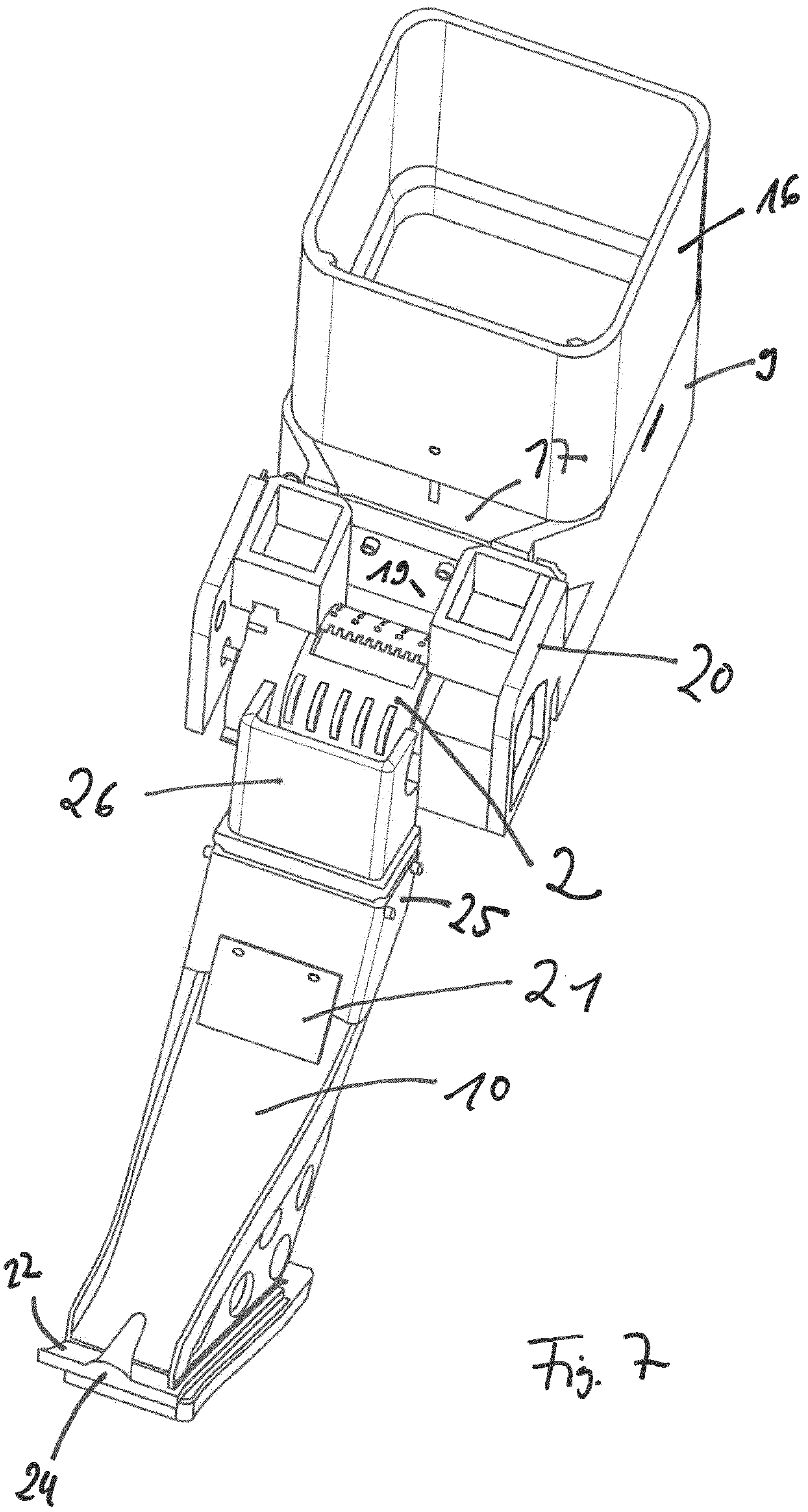
FIG. 7 shows a top view of a device according to the invention.

As shown in FIG. 7, the chute 10 can have a central bulge 24 instead of the ramp 23 at the slope 22, by means of which bulk material is deflected to the right or left from a conveying direction along the chute 10. The embodiment as shown in FIG. 7 may otherwise have all or some of the features described in connection with FIG. 6. They are not described again here, but reference is made to the explanations relating to FIG. 6.

In further embodiments, the bulge 24 and/or the lateral ramp 23 may be provided but no slope 22.

In addition, a catching section 25, which is designed to catch bulk material conveyed by the drum 2, is preferably height-adjustable or movably mounted on the housing 20 and/or an intermediate piece 26.

Figure 8:
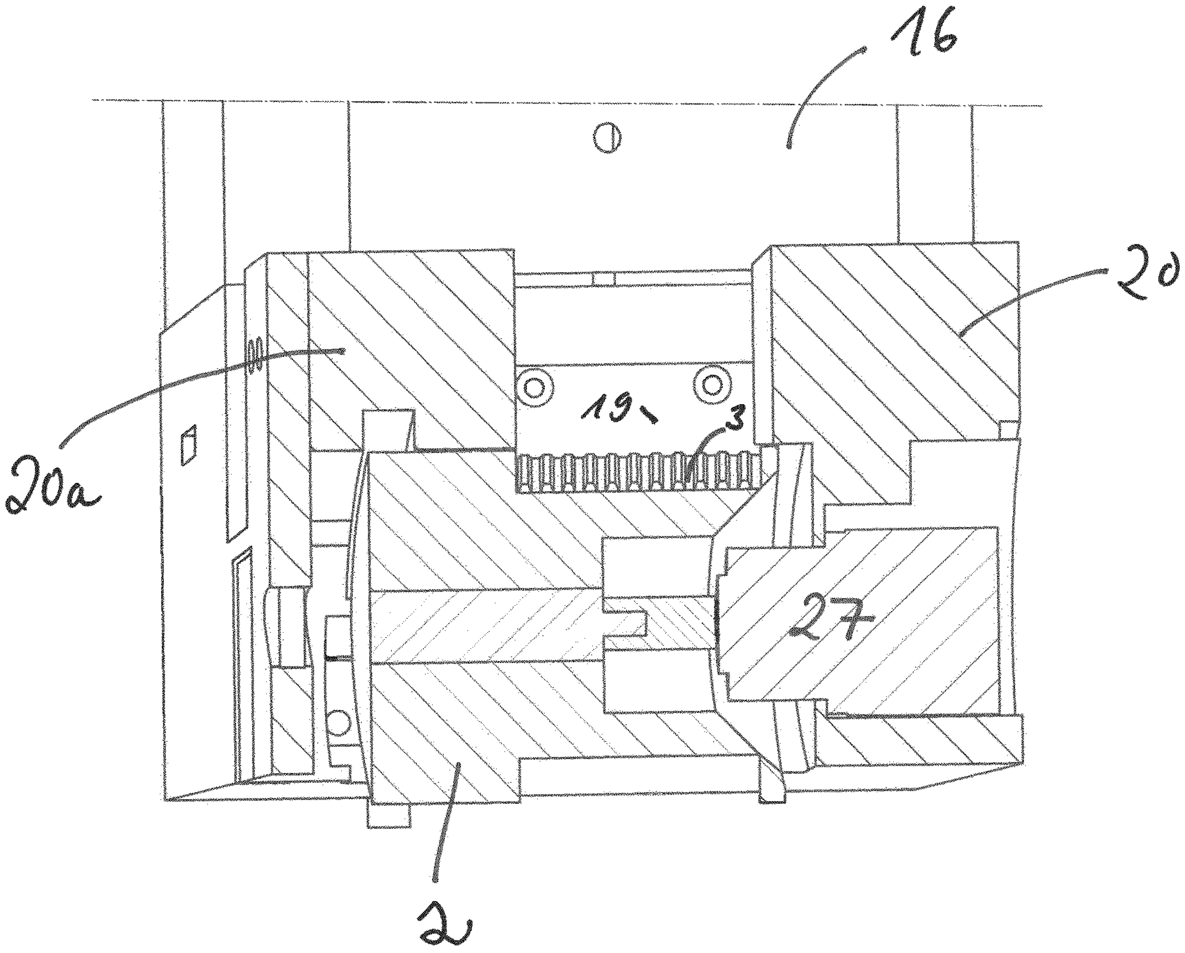
FIG. 8 shows a sectional view of a drum, which is installed in a device according to the invention.

As shown in FIG. 8, a motor and/or gear unit 27 is at least partially arranged in the drum 2 or integrated into it. This allows for a particularly compact design. The motor is preferably a stepper motor.

The housing half 20*a* shown on the left in the illustration in FIG. 8 is preferably removably or detachably connected to the rest of the housing 20 and thus permits simple maintenance or simple replacement of a drum 2 with integrated motor and/or gear unit 27.

The invention claimed is:

1. A device for separating bulk material including a plurality of workpieces, the device comprising:

a conveying device in the form of a rotatable drum comprising at least one receptacle, wherein the rotatable drum is configured to convey the bulk material by the at least one receptacle in a separated manner from a feeding area to a depositing surface during rotation of the drum, the separated manner comprising a reduction of the plurality of workpieces from the feeding area by a number comprising at least two workpieces of the plurality of workpieces, which are conveyed within one of the at least one receptacle from the feeding area to the depositing surface with one conveying stroke, and the device is designed to convey the bulk material at least in sections in a free-running manner by the rotatable drum, wherein the device does not have a wall opposite or adjacent to the rotatable drum along areas in which the bulk material is transported during operation, and not at a distance by which the conveying of the bulk material by the rotatable drum is influenced.

2. The device according to claim 1, wherein the at least one receptacle is a plurality of receptacles for separately conveying the bulk material from the feeding area.

3. The device according to claim 1, wherein in that the rotatable drum has one or more surface structures and wherein the one or more surfaces structures differ in shape from the at least one receptacle.

4. The device according to claim 3, wherein the one or more surface structures of the rotatable drum extend at least partially along the outer circumference of the drum.

5. The device according to claim 1, further comprising at least one limiting element provided between the rotatable drum and the feeding area, which limits flow of the bulk material to the rotatable drum.

6. The device according to claim 5, wherein the at least one limiting element comprises at least one brush and another limiting element, wherein the at least one brush is disposed between the rotatable drum and the feeding area, and the at least one brush is slidably mounted on the another limiting element via at least one resetting element.

7. The device according to claim 5, wherein the at least one limiting element comprises a first brush, a second brush, a first further limiting element and a second further limiting element, wherein the first brush and the second brush are disposed between the rotatable drum and the feeding area, the first brush is slidably mounted, via at least one resetting element, on the first further limiting element and the second brush is slidably mounted via the at least one resetting element, on the second further limiting element, wherein the first brush limits the movement of the bulk material from the feeding area and the second brush limits pick-up of the bulk material by the rotatable drum.

8. The device according to claim 1, further comprising at least one sensor in the form of a light barrier, wherein the at least one sensor is directed towards the rotatable drum and is connected to a control unit, the control unit configured to monitor the rotation of the rotatable drum by processing a signal from the at least one sensor.

9. The device according to claim 1, wherein the at least one receptacle of the rotatable drum has at least one curved or arched contour, such that a shovel-shaped receptacle is formed.

10. A system comprising at least one device for separating bulk material and a feeding area, wherein the at least one device comprises a conveying device in the form of a rotatable drum comprising at least one receptacle, wherein the rotatable drum is configured to convey the bulk material by the at least one receptacle in a separated manner from the feeding area to a depositing surface during rotation of the drum, the separated manner comprising a reduction of the plurality of workpieces from the feeding area by a number comprising at least two workpieces of the plurality of workpieces, which are conveyed within one of the at least one receptacle from the feeding area to the depositing surface with one conveying stroke, wherein the feeding area is for the bulk material and is in the form of a box or container, which is capable of or is connected to the at least one device, and/or a conveying device in the form of a chute or a conveyor belt configured to transport the at least two workpieces from the rotatable drum to the depositing surface.

11. The system according to claim 10, comprising the conveying device, wherein the conveying device is designed in the form of the chute, which at its end facing away from the rotatable drum has a curvature in the form of a slope with which the bulk material conveyed via the chute is guided against the force of gravity.

12. The system according to claim 11, wherein the chute has, at its end facing away from the rotatable drum in the area of the slope, at least one deflection means in the form of a bevelled edge and/or a bulge, such that the bulk material conveyed on the chute is capable of being deflected to the left and/or right out of a conveying direction.

13. The system according to claim 10, wherein the at least one device comprises a plurality of devices designed to convey the bulk material to the depositing surface, wherein the depositing surface is a common depositing surface for the plurality of devices.

14. The system according to claim 10, further comprising a pressing unit downstream of the at least one device for separating the bulk material.

15. The device according to claim 1, wherein the at least one receptacle is four receptacles for separately conveying the bulk material from the feeding area.

16. The device according to claim 1, wherein the rotatable drum has one or more surface structures in the form of protrusions and/or depressions, and wherein the one or more surfaces structures differ in shape from the at least one receptacle.

17. The device according to claim 1, wherein at least one limiting element in the form of a retaining wall is provided between the rotatable drum and the feeding area, which limits the flow of the bulk material to the rotatable drum.

18. The device according to claim 1, wherein the number is from a predefined range.

* * * * *